United States Patent [19]

Chang

[11] 4,188,472
[45] Feb. 12, 1980

[54] CURABLE LACTONE DERIVED RESINS

[75] Inventor: Wen-Hsuan Chang, Gibsonia, Pa.

[73] Assignee: PPG Industries, Inc., Pittsburgh, Pa.

[21] Appl. No.: 949,181

[22] Filed: Oct. 6, 1978

[51] Int. Cl.² ............................................. C08G 18/42
[52] U.S. Cl. .............................................. 528/75
[58] Field of Search .................................. 528/75

[56] References Cited

U.S. PATENT DOCUMENTS

| Re. 29,131 | 2/1977 | Smith et al. | 528/75 |
| 3,051,687 | 8/1962 | Young et al. | 528/75 |
| 3,169,945 | 2/1965 | Hostettler et al. | 528/75 |
| 3,186,971 | 6/1965 | Hostettler et al. | 528/75 |
| 3,509,102 | 4/1970 | Horn et al. | 260/45.95 |
| 3,651,021 | 3/1972 | Kincaid et al. | 528/75 |
| 3,654,347 | 4/1972 | Kincaid et al. | 260/615 B |
| 3,892,714 | 7/1975 | Sampson et al. | 528/75 |
| 3,931,117 | 1/1976 | Leonard | 427/25 |

Primary Examiner—Maurice J. Welsh
Attorney, Agent, or Firm—Charles R. Wilson

[57] ABSTRACT

Curable lactone derived resins are the reaction product of (a) a lactone modified resin of the formula

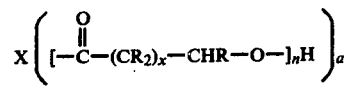

wherein X is the organic radical formed by removing at least one hydroxyl hydrogen atom from an ester containing from 1 to 3 acrylyl or alpha-substituted acrylyl groups and one or two hydroxyl groups, R is hydrogen or an alkyl group having from 1 to 12 carbon atoms, x is from 4 to 7 wherein at least (x+2) R's are hydrogen, n has an average value of from about 0.2 to about 5 and a is 1 or 2; and (b) an isocyanate.

The lactone derived resins are especially useful for floor tile coatings which are UV curable. The coatings are abrasion resistant, yet are flexible.

23 Claims, No Drawings

CURABLE LACTONE DERIVED RESINS

BACKGROUND OF THE INVENTION

The subject invention relates to lactone derived resins. More particularly, the invention relates to lactone derived resins which are UV curable and are useful as coating compositions.

Many useful polymeric coating compositions are known. Such compositions are conventionally applied from a liquid solution onto the substrate and thereafter cured to form a polymerized coating. The coating compositions generally contain an organic solvent. The solvent is removed after the coating composition is applied thereby leaving a deposit of the polymeric solids on the substrate. An elevated temperature is often used to drive off the organic solvent. In recent years, there has been concern about the possible environmental pollution and energy waste caused by organic solvents. Elaborate recovery systems can be used to recover most of the organic solvents driven from the coating compositions upon curing: however, these recovery methods generally are rather expensive to install and themselves are energy consuming.

One area of coating technology which has received considerable interest in recent years has been the formulation of high solids coating compositions. Such compositions can contain 100 percent solids, thereby eliminating the need for and concern with organic solvents. These coating compositions can be cured by conventional thermal means. The problems with most of the high solids coating compositions are that they are often too viscous to use or do not cure rapidly enough for most commercial applications.

A number of different UV curable coating compositions have been suggested for use. These compositions typically contain near 100 percent solids and are cured by the use of UV light. However, as with the high solids coating compositions, the prior art UV curable coating compositions are also often quite high in viscosity and therefore difficult to apply using normal coating techniques.

There has now been found coating compositions which have low viscosity and can be applied under normal coating conditions using conventional techniques. The compositions are used for in-mold coating operations as well as for operations where an UV-cure is desirable. The cured coatings are abrasion resistant and flexible.

As used herein, all percents and ratios are by weight unless otherwise indicated.

SUMMARY OF THE INVENTION

Useful lactone derived resins are the reaction product of:

(a) from about 30 percent to about 95 percent of a lactone modified resin of formula

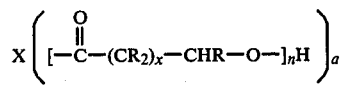

wherein X is the organic radical formed by removing at least one hydroxyl hydrogen atom from an ester containing from 1 to 3 acrylyl or alpha-substituted acryl groups and one or two hydroxyl groups, R is hydrogen or an alkyl group having from 1 to 12 carbon atoms, x is from 4 to 7 and at least (x+2) R's are hydrogen, n has an average value of from about 0.2 to about 5, and a is 1 or 2; and (b) from about 5 percent to about 70 percent of an isocyanate.

DETAILED DESCRIPTION OF THE INVENTION

The lactone derived resins of this invention can be formed by (a) reacting a lactone with an ester-containing acrylyl or alpha-substituted acrylyl groups and one or two hydroxyl groups and (b) reacting the product of step (a) with an isocyanate. Each of the reactants and the process of making the modified lactone resin are described in the following paragraphs.

The lactone used as a starting reactant herein has the formula

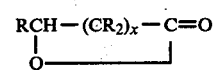

wherein R is hydrogen or an alkyl group having from 1 to 12 carbon atoms, x is from 4 to 7 and at least (x+2) R's are hydrogen. Preferred lactones are the epsilon-caprolactones wherein x is 4 and at least 6 of the R's are hydrogen with the remainder, if any, being alkyl groups. Preferably, none of these substituents contain more than 12 carbon atoms and the total number of carbon atoms in these substituents on the lactone ring does not exceed 12. Unsubstituted epsilon-caprolactone, i.e., where all the R's are hydrogen, is a derivative of 6-hydroxyhexanoic acid. Both the unsubstituted and substituted epsilon-caprolactones are available by reacting the corresponding cyclohexanone with an oxidizing agent such as peracetic acid.

Substituted epsilon-caprolactones found to be most suitable are the various epsilon-monoalkylcaprolactones wherein the alkyl groups contain from 1 to 12 carbon atoms, e.g., epsilon-methylcaprolactone, epsilon-ethylcaprolactone, epsilon-propylcaprolactone and epsilon-dodecylcaprolactone. Useful also are the epsilon-dialkylcaprolactones in which the two alkyl groups are substituted on the same or different carbon atoms, but not both on the omega carbon atoms. Also useful are the epsilon-trialkylcaprolactones wherein 2 or 3 carbon atoms in the lactone ring are substituted provided, though, the omega carbon atom is not disubstituted.

The most preferred lactone starting reactant is the epsilon-caprolactone wherein x in the formula is 4 and all the R's are hydrogen.

The above-described lactone is initially modified with an ester containing from 1 to 3 acrylyl or alpha-substituted acrylyl groups and one or two hydroxyl groups. Such esters are commercially available and/or can be readily synthesized. Commercially available esters include the hydroxyalkyl acrylates or hydroxyalkyl methacrylates wherein the alkyl group contains from 2 to 10 carbon atoms, preferably from 2 to 6 carbon atoms. The hydroxyalkyl acrylates and methacrylates have the following formula:

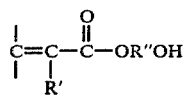

wherein R' is hydrogen or methyl and R" is a linear or a branched alkylene group having from 2 to 10 carbon atoms, preferably from 2 to 6 carbon atoms.

Examples of suitable hydroxyalkyl acrylates and methacrylates include 2-hydroxyethyl acrylate, 2-hydroxypropyl acrylate, 3-hydroxypropyl acrylate, 2-hydroxybutyl acrylate, 4-hydroxybutyl acrylate, 3-hydroxypentyl acrylate, 6-hydroxynonyl acrylate, 2-hydroxyethyl methacrylate, 2-hydroxypropyl methacrylate, 3-hydroxypropyl methacrylate, 2-hydroxybutyl methacrylate, 2-hydroxypentyl methacrylate, 5-hydroxypentyl methacrylate, 7-hydroxyheptyl methacrylate and 5-hydroxydecyl methacrylate. For UV curable coatings, the hydroxyalkyl acrylates are preferred, with hydroxyethyl acrylate being the most preferred acrylate compound. However, for in-mold coatings, the hydroxyalkyl methacrylates are preferred.

The ester used to react with the lactone can also be synthesized from an acrylic or methacrylic acid. In one method, the acrylic or methacrylic acid is reacted with an epoxy compound. The reaction results in the opening of the epoxy ring to form a hydroxyl group and the epoxy compound's attachment to the acrylic or methacrylic acid to form an ester. Epoxy compounds that can be used include styrene oxide, glycidol, ethylene oxide, propylene oxide, 1,2- and 2-3-butylene oxide, butyl glycidyl ether and phenyl glycidyl ether, as well as diepoxy compounds, e.g., bisphenol A diglycidyl ether and butanediol diglycidyl ether. These esters are readily synthesized using known processes.

Another ester which can be reacted with the lactone is derived from the reaction of an acrylic or methacrylic acid with a polyol. Known processes are used to esterify the acid with the polyol. In order to obtain the desired acrylyl or alpha-substituted acrylyl ester containing one or two hydroxyl groups, it is necessary that the polyol contain at least two hydroxyl groups. Suitable polyols include ethylene glycol, 1,2- and 1,3-propylene glycol, 1,3-, 1,4- and 2,3-butanediol, 1,5-pentanediol, 1,8-octanediol, diethylene glycol, dibutylene glycol, neopentyl glycol, pentaerythritol, 1,1,1-trimethylolpropane and 1,1,1-trimethylolethane.

A molar ratio of the lactone to hydroxyl groups in the ester of from about 1:0.1 to about 1:5, preferably from about 1:0.3 to about 1:3 is used. Generally, a temperature of from about 25° C. to about 150° C., preferably from about 25° C. to about 100° C. is used. Times of reaction vary depending upon the temperature and catalyst used; however, generally, the reaction is allowed to proceed for from about 20 minutes to about 10 hours, preferably from about 20 minutes to about 5 hours. Suitable catalysts include sulfuric acid, para-toluene sulfonic acid, stannous octoate and butyl titanate.

Using the above-mentioned molar ratios of the reactants, a mixture of compounds having the structure

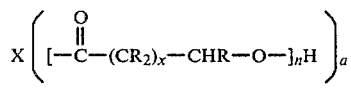

wherein X is the organic radical formed by removing at least one hydroxyl hydrogen from an ester containing from 1 to 3 acrylyl or alpha-substituted acrylyl groups and one or two hydroxyl groups, R is hydrogen or an alkyl group having from 1 to 12 carbon atoms, x is from 4 to 7 provided at least (x+2) R's are hydrogen, n has an average value of from 0.2 to 5 and a is 1 or 2 is formed.

The product of step (a) is next reacted with an isocyanate to form the modified lactone resin. Many suitable organic isocyanates are useful including aliphatic, cycloaliphatic, alkaryl, arylalkyl heterocyclic and aryl isocyanates. Examples of monoisocyanates include methyl isocyanate, ethyl isocyanate, chloroethyl isocyanate, chloropropyl isocyanate, chlorohexyl isocyanate, chlorobutoxypropyl isocyanate, hexyl isocyanate, phenyl isocyanate, chlorophenyl isocyanate, benzyl isocyanate, ethylphenyl isocyanate, octodecyl isocyanate, and isocyanatoethyl methacrylate. Examples of diisocyanates include tetramethylene diisocyanate, pentamethylene diisocyanate, octomethylene diisocyanate, dodecylmethylene diisocyanate, 3,3-diisocyanatodipropyl ether, xylylenediisocyanate, meta-phenylenediisocyanate, 1-methylphenylene-2,4-diisocyanate, 2,6-toluene diisocyanate, 2,6-toluene diisocyanate, cyclohexane-1,4-diisocyanate, methane-bis(-cyclohexy-4-isocyanate), and isophorone diisocyanate. Examples of triisocyanates include 1,3,5-benzene triisocyanate and 2,4,6-toluene triisocyanate toluene. The diisocyanates are the preferred isocyanate with toluene diisocyanate being preferred because of its low cost and desirable properties it imparts to the formed resin and isophorone diisocyanate being preferred because of its non-yellowing characteristics.

A molar equivalent or less of the isocyanate, based on the number of hydroxyl groups in the product of step (a), is reacted with the product of step (a). This corresponds to from about 30 percent to about 95 percent, preferably about 50 percent to about 80 percent of the lactone modified resin and from about 5 percent to about 70 percent, preferably from about 20 percent to about 50 percent of the isocyanate. The reaction is conducted at a temperature of from about 25° C. to about 150° C., preferably from about 25° C. to about 80° C. for from about 20 minutes to about 5 hours, preferably from about 20 minutes to about 2 hours.

A polyol can be included in the above described reaction between the product of step (a) and the isocyanate to provide additional desirable properties to the resins. The polyol employed can be any monomeric or polymeric polyol having an average of more than one hydroxyl group and up to 8 hydroxy groups per molecule. Useful polyols include ethylene glycol, 1,4-butanediol, 1,6-hexanediol and the other alkylene glycols, cyclohexane dimethanol, hydrogenated bisphenol-A as well as polymeric polyols including polyether polyols such as poly(oxypolymethylene) glycols, oxyalkylated trimethylol propane, hydroxyl-containing epoxy resins and epoxy esters. The amount of polyol reacted ranges up to about 20 percent of the total reactants, although less than about 5 percent of the polyol is preferred.

The above-described reactions can be carried out in the presence of an inert organic solvent, e.g., styrene, toluene, butanone, ethyl acetate, ethylene diacrylate and ethylhexyl acrylate. Preferably, however, the reactions are carried out in the absence of an organic solvent so as to resul in the composition containing 100 percent solids.

The lactone derived resins have a viscosity of less than about 600 poises, preferably less than about 60 poises, thereby making them suitable for conventional application to many different substrates. The resins are curable and have been found to be especially useful for the coating of floor tiles. The cured coating is relatively abrasion resistant and flexible.

Coating compositions can contain 100 percent of the lactone derived resin. However, a minor amount, i.e., up to about 20 percent of a non-reactive solvent can also be included in the composition for further viscosity reduction, flow control, etc. Examples of such solvents include xylene, toluene, methyl chloride, 2-methoxyethanol, methyl isobutyl ketone and isopropanol. Other curable components can be included in the compositions to impart various properties to the cured coatings. Suitable curable components include any of the conventional ethylenically unsaturated monomers in an amount up to about 50 percent, based on the combined weight of the monomers and the modified lactone resin. Classes of curable components include the styrenes, vinyl amides, esters of vinyl alcohols, acrylate esters, glycol diacrylates, triol and tetraol polyacrylates, urethane diacrylates, maleate esters and fumarate esters. Additionally, compositions of the lactone derived resin and from about 0.1 percent to about 10 percent, preferably about 1 percent to about 5 percent of an activator, such as a photosensitizer or photoinitiator can be formulated. Examples of satisfactory activators include benzophenone, p-methoxybenzophenone, acetophenone, m-chloroactophenone, propiophenone, xanthone, benzoin, benzil, benzaldehyde, naphthoquinone, anthraquinone, di-t-butyl peroxide, dicumyl peroxide, t-butyl hydroperoxide, t-butyl peracetate, peractic acid, perbenzoic acid, benzoyl peroxide, dichlorobenzoyl peroxide, azobis(isobutyronitrile), dimethylazobis(isobutyrate), morpholine, diethylamine, piperidine and pyrrolidine.

The lactone derived resins are used for in-mold coating operations and in coating operations where the compositions are applied to a substrate using conventional techniques, e.g., spraying, brushing, roll coating or dipping. Substrates which are coated with the lactone derived resins vary widely and include such substrates as wood, fiber board, particle board, composition board, paper, cardboard and various polymers such as polyesters, polyamides, cured phenolic resins, cured aminoplasts, acrylics, polyurethanes and rubber. Inorganic substrates include glass, quartz, ceramic materials and metallic substrates, e.g., iron, steel, copper and aluminum.

Suitable energy sources used to cure the coatings include thermal, electron beam and ultraviolet light. Suitable UV sources include mercury arcs, carbon arcs, low pressure mercury lamps, medium pressure lamps, high pressure mercury lamps, swirl-flow plasma arc, ultraviolet light emitting diodes and ultraviolet light emitting lasers. The time of exposure to the ultraviolet light and the intensity of the ultraviolet light can vary greatly.

The examples which follow are illustrative of the invention described herein with Example VI representing what is considered to be the preferred embodiment of the invention. The described lactone derived resins are all curable and capable of being applied to substrates as 100 percent solids compositions. The compositions provide the substrates with durable, abrasion resistant and flexible coatings.

EXAMPLE I

A five liter reaction vessel is set up with stirrer, condenser, air spare and thermometer. Epsilon-caprolactone (2456 grams, 22 moles) and hydroquinone (19 grams) are charged to the reaction vessel and heated to a temperature of 130° C. At this point, hydroxyethyl acrylate (1276 grams, 11 moles) and TPT titanate (4.8 grams) are added to the reaction vessel. The temperature is maintained at 130° C. for the next ½ hour. Two and eight tenths (2.8) grams of the TPT titanate is now added. The temperature of 130° C. is maintained for about 6 hours.

The sampled product is analyzed and found to be a lactone modified resin having a hydroxyl value of 162.

The lactone modified resin described (258 grams, 0.75 moles) and isophorone diisocyanate (75 grams, 0.34 moles) are blended and held at 65° C. for 3 hours, then taken to 93° C. for 4 hours. The resultant lactone derived resin mixture is analyzed and found to have no NCO groups, an acid value of 4.26, a hydroxyl value of 18.7, a solids content of 94 percent and a viscosity of 85 poises.

EXAMPLE II

A twelve liter reaction vessel is set up with stirrer, condenser, thermometer and air sparge. The vessel is charged with 3,108 grams of epsilon-caprolactone, 46 grams hydroquinone and 8 grams of 2-(2'-hydroxy-5'-methylphenyl)benzotriazole, a UV absorber sold under the trademark, Tinuvin P. The mixture is heated to 120° C. and has 6215 grams of hydroxyethyl acrylate added to it. The mole ratio of the caprolactone to hydroxyethyl acrylate is 1:2. Four grams of stannous octanate and 10.5 grams of dibutyltin dilaurate are now added to the reaction mixture and heated to 120° C. over the next 1 hour. The temperature is maintained at 120° C. for the next 8 hours.

An IR analysis shows the reaction of the caprolactone and hydroxyethyl acrylate to be complete. The reaction product has an acid value of 8.1 and an hydroxyl value of 318.

The reaction product of this invention is made by blending 190 grams of the aforedescribed reaction product (1.1 mole) and 105 grams of tetramethylene diisocyanate (0.5 moles) and holding it at a temperature of 65° C. for 4 hours and then 93° C. for an additional 4 hours. The viscosity of the resultant product is 25 poises.

EXAMPLE III

The process of Example II is repeated using the same reactants and reaction conditions. However, in this Example 6780 grams of the epsilon-caprolactone and 2,320 grams of hydroxyethyl acrylate are used. The mole ratio of caprolactone to hydroxyethyl acrylate is 1:0.33. The reaction mixture is analyzed at the end of the reaction time and found to have an acid value of 1.5 and an hydroxyl value of 122.

Two hundred twenty-nine (229) grams of the aforedescribed reaction product (0.5 mole) is mixed with 50 grams of isophorone diisocyanate (0.225 mole) and held for 3 hours at 65° C. and 4 hours at 93° C. IR analysis shows there to be no NCO. The product has an acid value of 3.56, an hydroxyl value of 13.7, a solids content of 97.0, and a viscosity of 85.

EXAMPLE IV

A five liter reaction vessel set up as in Example I is initially charged with 1938 grams of episilon-caprolactone (17 moles) and 3.65 grams of Tinuvin P (a UV absorber). The mixture is heated to 120° C., at which time 2210 grams of hydroxyethyl methacrylate (17 moles) and 2.1 grams of stannous octanate are added. The mixture is held at 120° C. for about 6 hours. At this point, an additional 2.1 grams of stannous octanate is added. At the end of a 5 hour period, IR analysis indicates the reaction is complete. The reaction product has an acid value of 20.0 and a hydroxyl value of 239.

Eight hundred (800) grams of the aforedescribed product and 252 grams of toluene diisocyanate are blended at room temperature. The mixture is heated to 65° C. for 1 hours, and then left at room temperature for the next 12 hours. An IR analysis shows there to be no NCO groups present. The resultant product has an acid value of 15.2, an hydroxyl value of 35.9 and a viscosity of 55 poises.

EXAMPLE V

This example illustrates the addition of a polyol to the reaction product of a caprolactone and hydroxyethyl acrylate.

A twelve liter reaction set up as in Example I is charged with 4525 grams of episilon-caprolactone (40 moles), 47 grams paramethoxyphenol and 8 grams Tinuvin P and heated to 120° C. Hydroxyethyl acrylate (4640 grams, 40 moles), is now added, followed by the addition of 4.8 grams stannous octoate and 10.5 grams dibutylin dilaurate. The temperature is maintained at 120° C. for 9 hours. An IR analysis shows the reaction is complete with the reaction mixture having an acid value of 6.9 and a hydroxyl value of 241.

The lactone derived resin of the invention is made by blending 240.5 grams of the above reaction mixture, 20.1 grams trimethylolpropane and 141.8 grams toluene diisocyanate and heating to 100° C. After the mixture cooled to 65° C., 5 grams of dibutyltin dilaurate is added. After a hold period of 2 hours at 65° C. and 2 hours at 95° C. an IR analysis shows no NCO, thereby indicating the reaction is complete. The product has an acid value of 4.17, hydroxyl value of 25.9, solids content of 97.0 percent and a viscosity of 95 poises.

EXAMPLE VI

A twenty-two liter reaction vessel set up as in Example I is charged with 8958.4 grams epsilon-caprolactone (79.3 moles), 92.4 grams para-methoxyphenol and 15.7 grams Tinuvin P. The mixture is heated to 120° C., at which time 9114.6 grams of hydroxyethyl acrylate (78.6 moles) is added. Next, 9.5 grams stannous octoate and 20.7 grams dibutyltin dilaurate are added and the mixture heated to 120° C. and held at 120° C. over a 6 hour period. An IR analysis shows the reaction to be complete. The reaction mixture has an acid value of 5.0 and a hydroxyl value of 231.

Next, 17,812 grams (75 moles) of the above reaction mixture and 8,112 grams (31 equivalents) of bis(4-isocyanatocyclohexyl)methane are charged to a reaction vessel over a 1 hour period. The reactants are held at 95° C. for 2 hours. An IR analysis shows no NCO present. The reaction mixture has an acid value of 3,4-hydroxyl value of 34.7 and a viscosity of 50 poises.

Fifty (50) grams of the above product and 1 gram isobutyl benzoin ether are blended and applied with a 0.034 bar to an aluminum panel. The coating is UV cured by running it through a unit with 4 lamps (200 watts/in.) set 3 inches above the substrate and at a rate of 60 feet/min. A nitrogen atmosphere is maintained in the unit. The coating on the panel is cured as evidenced by its durable finish.

The above examples illustrate the making of the lactone derived resins of this invention. Coatings possessing a beneficial set of properties are obtainable from the described resins.

What is claimed is:

1. A curable lactone derived resin which is the reaction product of:
   (a) from about 30 percent to about 95 percent by weight of a lactone modified resin of formula

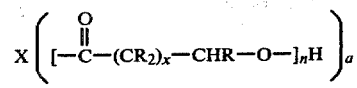

wherein X is the organic radical formed by removing at least one hydroxyl hydrogen atom from an ester containing from 1 to 3 acrylyl or alpha-substituted acrylyl groups and one or two hydroxyl groups, R is hydrogen or an alkyl group having from 1 to 12 carbon atoms, x is from 4 to 7 and at least (x+2) R's are hydrogen, n has an average value of from about 0.2 to about 5, and a is 1 or 2; and
   (b) from about 5 percent to about 70 percent by weight of an isocyanate.

2. The lactone derived resin of claim 1, wherein the isocyanate is derived from a monoisocyanate, diisocyanate, triisocyanate or mixtures thereof.

3. The lactone derived resin of claim 2, wherein x is 4 and at least six of the R's are hydrogen.

4. The lactone derived resin of claim 3, wherein a is 1.

5. The lactone derived resin of claim 3, wherein a is 2.

6. The lactone derived resin of claim 3, wherein the lactone modified resin is derived from epsilon-caprolactone.

7. The lactone derived resin of claim 2, wherein X is derived from a hydroxyalkyl acrylate or methacrylate.

8. The lactone derived resin of claim 7, wherein the hydroxyalkyl acryklate or methacrylate is hydroxyethyl acrylate.

9. The lactone derived resin of claim 2, wherein X is derived from the reaction product of an acrylic or methacrylic acid and an epoxy compound.

10. The lactone derived resin of claim 2 wherein X is derived from the reaction product of an acrylic or methacrylic acid and a polyol.

11. The lactone derived resin of claims 1 or 2 being the reaction product of from about 50 percent to about 80 percent by weight of the lactone modified resin and from about 20 percent to about 50 percent by weight of the isocyanate.

12. The lactone derived resin of claims 7, 9 or 10 being the reaction product of the lactone modified resin, the isocyanate and up to about 20 percent by weight of a polyol.

13. A process of making a UV curable lactone derived resin, comprising the steps of:
   (a) reacting a (1) lactone of formula

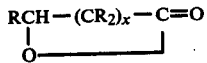

wherein R is hydrogen or an alkyl group having from 1 to 12 carbon atoms, x is from 4 to 7, and at least (x+2) R's are hydrogen with (2) an ester containing from 1 to 3 acrylyl or alpha-substituted acrylyl groups and one or more hydroxyl groups; and (b) reacting from about 30 percent to about 95 percent by weight of the product of step (a) with from about 5 percent to about 70 percent by weight of an isocyanate to form the lactone derived resin.

14. The process of claim 13, wherein the isocyanate is a monisocyanate, diisocyanate, triisocyanate or mixture thereof.

15. The process of claims 13 or 14, wherein x is 4 and at least six of the R's are hydrogen.

16. The process of claim 14, wherein the ester is a hydroxyalkyl acrylate and methacrylate having from 2 to 10 carbon atoms in the alkyl group.

17. The process of claim 16, wherein the hydroxyalkyl acrylate or methacrylate is hydroxyalkyl acrylate.

18. The process of claim 17, wherein an epsilon-caprolactone is reacted with hydroxyethyl acrylate.

19. The process of claim 14, wherein the ester is derived from the reaction of an acrylic or methacrylic acid with an epoxy component.

20. The process of claim 14 wherein the ester is derived from the reaction of an acrylic or methacrylic acid with a polyol.

21. The process of claims 16, 19, or 20 wherein up to about 20 percent by weight of a polyol is reacted with the product of step (a) and the isocyanate.

22. The process of claim 13 wherein the molar ratio of the lactone to the hydroxyl groups in the ester is from about 1:0.1 to about 1:5.

23. The process of claim 22 wherein from about 50 percent to about 80 percent by weight of the product of step (a) is reacted with from about 20 percent to about 50 percent by weight of the isocyanate.

* * * * *